United States Patent Office 3,277,076
Patented Oct. 4, 1966

3,277,076
POLYETHER POLYOL USEFUL AS INTERMEDIATE IN PREPARATION OF POLYURETHANE FOAM
Masaru Yotsuzuka, Kobe, Japan, assignor to Takeda Chemical Industries, Ltd., Osaka, Japan
No Drawing. Filed May 4, 1964, Ser. No. 364,815
Claims priority, application Japan, May 4, 1963, 38/23,245
3 Claims. (Cl. 260—209)

This invention relates to polyether polyol, more particularly to new polyether polyol useful as an intermediate in the preparation of polyurethane foam, especially of rigid polyurethane foam, and to the process of the production thereof.

Though reducing sugars such as glucose, invert sugar and wood sugar have been known to be available cheaply and abundantly in natural resources, they have been little used as starting materials for the production of polyether polyol useful as an intermediate in the preparation of polyurethane foam; the reason is that they become highly colored when they are subjected to addition reaction with alkyleneoxide according to conventional processes.

Recently, only methylglucoside has been noted as a starting material for polyether polyol for the production of polyurethane foam. However, methylglucoside which is prepared by the reaction of glucose or starch with methyl alcohol, is very expensive as compared with glucose. Moreover, the compound must be purified to the fullest extent, since methylglucoside involving only a trace of methyl alcohol gives polyether polyol of inferior properties, and polyurethane foam derived from such polyether polyol is also inferior in quality. Therefore, it cannot be said to be suitable to employ methylglucoside as starting material for preparing polyether polyol from the commercially feasible viewpoint.

The present invention is based upon the unexpected finding that it is possible on an industrial scale to make use of such materials as glucose, invert sugar and wood sugar, which are easily available, for the preparation of new polyether polyol suitable for the production of polyurethane foam of good properties. According to this invention, the production of the new polyether polyol is easily carried out without causing coloring or deterioration of the reducing mono-saccharide, by the expedient of subjecting alkyleneoxide to addition polymerization, while employing, as an initiator, the reaction product of 3- to 6-functional polyol and reducing mono-saccharide under acidic conditions; even in case crude reaction mixture of reducing mono-saccharide and 3- to 6-functional polyol is employed as is, polyether polyol which can be converted to polyurethane foam having superior properties can be obtained, without the need of purifying the said crude reaction mixture. Polyether polyol according to this invention is prepared by subjecting alkyleneoxide to addition polymerization employing, as so-called initiator, the reaction mixture which is prepared by the reaction of 3- to 6-functional polyol with reducing mono-saccharide under acidic conditions. Among reducing mono-saccharides employable are for example, glucose, invert sugar, wood sugar and galactose. A mixture of two or more of these mono-saccharides may be employed. Of these, glucose or invert sugar is preferred.

Three- to six-functional polyols which can be preferably employed in this invention have 3 to 6 carbon atoms, and those which have not less than one non-tertiary hydroxyl group and have no other functional groups than hydroxyl groups are desirably employed.

The 3- to 6-functional polyols mentioned above comprise, for example, glycerol, trimethylol propane, pentaerythritol, sorbitan, mannitan, hexantriols, sorbitol and mannitol; a mixture of two or more of these may be employed. The reaction of polyol with reducing mono-saccharide is carried out under acidic condition in the presence of acidic material or of material which is converted into acid during the reaction.

The acidic materials mentioned above comprise, for example, mineral acids such as hydrogen chloride, sulfuric acid, phosphoric acid and perchloric acid; organic amine salts of the said mineral acids such as pyridine salts, quinoline salts, aniline salts, methylamine salts and ethylamine salts; Friedel-Crafts type catalysts such as boron trifluoride, aluminum chloride, stannic chloride and ferric chloride; and organic sulfonic acids such as p-toluenesulfonic acid, methanesulfonic acid and ethanesulfonic acid. Substances which yield acid during the reaction comprise halogens such as chlorine, iodine and bromine.

Of the afore-mentioned acidic materials and those which are converted into acid during the reaction, mineral acids, p-toluenesulfonic acid and halogens (especially iodine) are preferably employed. An appropriate amount of the acidic or acid yielding material is 1 percent or less by weight of the reducing mono-saccharide used.

The reaction of the polyol with the reducing mono-saccharide is carried out at a temperature of about 70 to about 100° C., desirably at about 100 to about 150° C., and preferably under dehydrating conditions as under reduced pressure, the degree of which is desirably lower than the vapor pressure of water but higher than that of the polyol employed, or under blowing of dry inert gas, or under heating at a temperature higher than 100° C. in an open vessel.

The process mentioned above may be carried out continuously by the use of a falling-type thin film evaporator or packed tower. To avoid coloring of the reaction product caused by the presence of unreacted reducing mono-saccharide, and to make the reaction easier, the amount of polyol employed should be at least one equivalent, preferably two equivalents, relative to the reducing mono-saccharide. In the reaction of polyol with a reducing mono-saccharide, any excess amount of polyol may be employed.

In carrying out the reaction of 3- to 6-functional polyol with reducing mono-saccharide, an addition of glycol such as ethylene glycol, propylene glycol, diethylene glycol and dipropylene glycol to the reaction mixture cause the reaction to proceed much more easily. Especially in the case of employing functionally higher polyol, the reaction is carried out much easier by the addition of a glycol. However, it is not suitable to employ, as an initiator, the reaction product obtained by allowing only glycol to react with reducing mono-saccharide, since glycol inevitably remaining in the reaction product gives, unlike the case of employing tri- or higher functional polyol, inferior properties to polyurethane foam produced therefrom.

The amount of glycol to be added is within the range of 0.1 to 10 times as much as the weight of the 3- to 6-functional polyol employed.

In case functionally higher polyol such as sorbitol is employed as the 3- to 6-functional polyol, the addition of triol (such as trimethylol propane, glycerol) instead of glycol makes the reaction easier to the same extent as mentioned above. From the fact that little unreacted reducing mono-saccharide remains in the reaction product thus obtained, it is understood though the details of the structure of the reaction product are not clear, that the reaction product contains mainly glycoside having glycosidic linkages between the glycosidic hydroxyl group of the reducing mono-saccharide and one or more hydroxyl groups of the 3- to 6-functional polyol. An excess amount of 3- to 6-functional polyols often remains unreacted in the reaction products.

Employing thus-obtained reaction product as an initiator, alkylene oxide is allowed to polymerize. The reaction product may be employed in the addition polymerization of alkylene oxide without being separated or purified. Alkylene oxides, for the purposes of this invention, comprise, for example, ethylene oxide, propylene oxide, butylene oxide, isobutylene oxide, styrene oxide and epichlorhydrine. A mixture of two or more thereof may be employed.

Of these alkylene oxides, ethylene oxide, propylene oxide or a mixture thereof is most preferably employed.

The addition polymerization of alkylene oxide with the use of the afore-mentioned initiator is carried out preferably in the presence of catalyst. The catalyst is selected from those which have been used in per se known processes for polymerization of alkylene oxide; for example, such alkaline materials as alkali metal hydroxide, alkali metal alcoholate, organic bases, and such acidic materials as mineral acid, boric acid and Friedel-Crafts type catalyst, may be employed. Of these catalysts, alkaline materials are preferable.

The amount of the catalyst to be employed may be that generally used in the per se known polyoxyalkylation process. The addition polymerization of alkylene oxide is carried out under elevated pressure or atmospheric pressure, in the presence or absence of a solvent such as dimethyl sulfoxide, dimethyl formamide or xylol. The reaction temperature is from about 80 to about 200° C., preferably from about 100 to about 160° C. During the polymerization, the reactants are desirably maintained out of contact with air or oxygen.

The molecular weight of the polyether polyol obtained may be varied widely, by the variation of the ratio of the alkylene oxide to the initiator. Among thus-obtained polyether polyols, those having a hydroxyl number of about 250-550 (mg. KOH/g.) are suitable for the production of rigid polyurethane foam. The polyether polyol in this invention may be employed together with other polyether polyol or polyester polyol to obtain polyurethane foam. In such case, polyether polyol having a hydroxyl number of more than 550 (mg. KOH/g.) may also be employed. In this invention, the polymerization of alkylene oxide may be carried out in the presence of a mixture of a known initiator such as glycols and glycerol and the afore-mentioned reaction product of 3- to 6-functional polyol and reducing mono-saccharide.

Polyurethane foams are produced by allowing the polyether polyol of this invention to react with a polyisocyanate compound in the presence of blowing agent.

Usable polyisocyanate compounds are those having two or more isocyanato groups, and include, for example, ethylene diisocyanate, hexylene diisocyanate, cyclohexylene diisocyanates, metaphenylene diisocyanate, tolylene diisocyanates, 3,3'-dimethyl-4,4'-biphenylene diisocyanate, 4,4'-biphenylene diisocyanate, triphenylmethane triisocyanate, and their derivatives which are preparable by allowing the polyisocyanate compound to react with low molecular polyol such as hexanetriol, trimethylol propane, glycerol, propylene glycol and ethylene glycol.

As the blowing agent, any of those hitherto-employed for the manufacture of polyurethane foam can be used, and they include, for example, water or a compound capable of generating water under the reaction conditions, a halogenated hydrocarbon having a low boiling point such as dichlorodifluoromethane and trichloromonofluoromethane, and a compound capable of generating nitrogen gas under reaction conditions such as azo compounds. The reaction is usually effected in the presence of catalyst and, desirably, foam stabilizer. The catalysts for the foaming reaction include, for example, tertiary amines (such as N-methyl-morpholine, triethylamine, N,N,N'N' - tetramethyl - 1,3 - butanediamine, N,N,N',N'-tetrakis(2-hydroxypropyl)ethylenediamine and the like) and organic tin compounds (such as dibutyl tin dilaurate, dibutyl tin di(2-ethylhexoate), stannous octoate and stannous 2-ethylhexoate). The foam stabilizer to be used includes, for example, silicone oils and non-ionic surface active agents. In addition, pigments, supplements or mechanically reinforcing substances, antioxidants and other stabilizers may be used. The reaction of the polyether polyol with polyisocyanate compound in the presence of blowing agent can be carried out by any of the hitherto-employed processes, for example, the so-called one-shot process or pre-polymer process.

As previously stated, according to the present invention, polyether polyol which can be converted to polyurethane foam of superior properties by reacting with polyisocyanate is obtained by employing reducing monosaccharide, available from cheap and abundant natural resources, characterized in that the reaction product is not colored or deteriorated and in that it is not necessary to purify the crude reaction product of polyol and reducing mono-saccharide. Therefore, the polyether polyol suitable for the production of polyurethane foam can be prepared more cheaply and more easily by the process of this invention than by hitherto known processes.

This invention makes it also possible to prepare remarkably high functional polyether polyol easily by a simple process. Moreover, polyether polyol in this invention, even if its hydroxyl number is low in comparison with hitherto-known polyether polyol, can be converted to polyurethane foam having superior properties.

From the foregoing description, it will be understood that this invention has remarkable merit from an industrial viewpoint.

The following examples, in which all parts are expressed by weight unless otherwise specified, will serve to illustrate the practice of the invention in more detail. The relationship between part by weight and part by volume is the same as that between gram and milliliter.

PART A

Example 1

Trimethylolpropane (3000 parts) and crystalline glucose (1000 parts) were melted under heating at about 120° C. After being dehydrated under reduced pressure, the melted mixture was supplied with iodine (1 part). Then the resulting mixture was heated at a temperature of 125 to 130° C. for two hours, and further kept for two hours at the same temperature under reduced pressure of 50 mm. Hg, whereupon the reaction product showing no mutarotation but having the specific rotation $$[\alpha]_D^{25} = +21.1°$$

(in $H_2O$) was obtained. To the reaction product (3040 parts), sodium hydroxide (359 parts) was added, and then propylene oxide was added dropwise, without the use of solvent, at a temperature of 140 to 160° C. under atmospheric pressure, whereupon reaction ensued.

The reaction was continued until the resulting product amounted to about 9600 parts. Thus-obtained product was supplied with water (10,000 parts) and methyl alcohol (2000 parts), and treated with carboxylic acid type cation exchange resin (Amberlite IRC-50) in the free form. Then volatile matter was evaporated from the resulting solution to leave about 8700 parts of the desired polyether polyol having a hydroxyl number of 299.9 (mg. KOH/g.) and water content of 0.14 percent by weight.

Example 2

1,2,6-hexanetriol (1340 parts), crystalline glucose (1980 parts) and iodine (2 parts) were allowed to react in a similar manner as in Example 1. The resulting reaction product (2585 parts) was mixed with dimethylsulfoxide (1000 parts) and potassium hydroxide (268 parts. The mixture was heated up to about 140° C. Propylene oxide was added dropwise to the so-heated mixture to allow the reaction to take place. With the proceeding of the reaction, the reaction temperature was gradually lowered to a temperature of 100° C. The reaction was continued until the resulting product amounted to about 8000 parts. Thus-obtained product was mixed with water (10,000 parts) and treated with carboxylic acid type cation exchange resin in the free form.

Water and dimethylsulfoxide were evaporated from the resulting solution to leave about 6300 parts of the desired polyether polyol having a hydroxyl number of 414.8 (mg. KOH/g.), acid number 0.001 and water content 0.14 percent by weight.

*Example 3*

Diethylene glycol (1060 parts), sorbitol (911 parts), crystalline glucose (1982 parts) and iodine (2 parts) were allowed to react in a similar manner as in Example 1 to obtain a reaction product showing the specific rotation $[\alpha]_D^{19} = +39.5°$ (in $H_2O$) and free glucose content 0.62 percent by weight.

Thus-obtained reaction product (3140 parts) was mixed with dimethylsulfoxide (1000 parts) and potassium hydroxide (402 parts), and then propylene oxide was added dropwise to the mixture to allow the reaction to take place in a similar manner as in Example 1.

The resulting product was dissolved in water and treated with carboxylic acid type cation exchange resin (Amberlite IRC–50) in the free form to obtain about 10,000 parts of the desired polyether polyol having a hydroxyl number of 366.4 (mg. KOH/g.) and acid number 13.

*Example 4*

A mixture of 1,2,6-hexanetriol (1340 parts) and crystalline glucose (4000 parts) was dehydrated under heating at about 110° C. in dried nitrogen gas stream for one hour. So-treated mixture was supplied with iodine (4 parts) and allowed to react in a similar manner as in Example 1 to obtain about 4700 parts of reaction product with a dark color. The reaction product (4000 parts) was mixed with dimethylsulfoxide (2000 parts) and potassium hydroxide (416 parts) and then allowed to react with propylene oxide in a similar manner as in Example 1. The resulting product was treated after the manner of Example 3 to obtain about 9500 parts of the desired polyether polyol having a hydroxyl number of 395 (mg. KOH/g.) and acid number 0.4.

*Example 5*

Trimethylol propane (268 parts), pentaerythritol (136 parts) and crystalline glucose (180 parts) were melted under heating at about 120° C. After being dehydrated under heating at the same temperature for two hours in dried nitrogen gas stream, the melted mixture was cooled to about 80° C. and was supplied with iodine (0.2 part). The resulting mixture was heated under reflux at a temperature of 120 to 130° C. for 2.5 hours, and then was dehydrated by heating at a temperature of 115 to 120° C. under reduced pressure of 30 to 50 mm. Hg. In the obtained reaction product (575 parts), potassium hydroxide (7.5 parts) was dissolved, and ethylene oxide (230 parts by volume) was added (dropwise) at a temperature of 110 to 120° C. to allow reaction to take place, and further propylene oxide was added dropwise at the same temperature until a yield of about 1450 parts of product resulted.

Thus-obtained product was cooled to 60° C., neutralized to weak acidity with hydrochloric acid and filtered to remove precipitated crystalline potassium chloride. The filtrate was dried by introducing nitrogen gas for 2.5 hours at 120° C. to obtain about 1400 parts of the desired polyether polyol as light brown viscous liquid, having a hydroxyl number 486.2 (mg. KOH/g.), acid number 0.1 and water content 0.048 percent by weight.

*Example 6*

Trimethylol propane (134 parts), pentaerythritol (136 parts) and crystalline glucose (180 parts) were treated to allow reaction to take place in a similar manner as in Example 5.

After the addition of potassium hydroxide (5.0 parts), the resulting product (430 parts) was allowed to react with ethylene oxide (180 parts by volume) in a similar manner as in Example 5 and then with propylene oxide as in Example 5 until about 1160 parts of the resulting product was obtained.

The resulting product was neutralized with oxalic acid and filtered to remove precipitated potassium oxalate. The filtrate was dehydrated by introducing dried nitrogen gas at 120° C. to obtain about 1150 parts of the desired polyether polyol as light brown viscous liquid, having a hydroxyl number (mg. KOH/g.) of 490.1, acid number 0.08 and water content 0.05 percent by weight.

PART B

*Example 7*

Polyether polyol (100 parts) obtained in Example 2, dimethyl ethanolamine (1.0 part), dibutyl tin dilaurate (0.4 part), silicone oil (1.5 parts), monofluoro-trichloroethane (29 parts) and polyisocyanate (Nacconate-4040) (88 parts) were all rapidly admixed under vigorous agitation to allow polymerization to take place. After a cream time of 14 seconds and rising time of 52 seconds, the mixture turned to foam which showed the following properties:

Density: 0.028 gram/cubic centimeter
Compression load: 1.72 kilogram/square centimeter
Dimensional stability: Good
Friability: Remarkably good

*Example 8*

Polyether polyol (100 parts) obtained in Example 3, dimethyl ethanolamine (1.0 part), dibutyl tin dilaurate (0.4 part), silicone oil (1.5 parts), monofluoro-trichloromethane (29 parts) were all admixed, followed by addition of polyisocyanate (Nacconate-4040) (88 parts). The mixture was vigorously agitated to allow polymerization to take place. After a cream time of 9 seconds and rising time of 99 seconds, the mixture turned to foam which showed the following properties:

Density: 0.035 gram/cubic centimeter
Compression load: 1.93 kilogram/square centimeter
Dimensional stability: Good
Friability: Remarkably good

*Example 9*

Polyether polyol (100 parts) obtained in Example 5, dibutyl tin dilaurate (0.4 part), dimethyl ethanolamine (1.0 part), silicone oil (1.5 parts), trichloro-monofluoromethane (30 parts) and polyisocyanate (Nacconate-4040) (97 parts) were all rapidly admixed to allow polymerization to take place. After a cream time of 24 seconds and rising time of 90 seconds, the mixture turned to foam having the following properties:

Density: 0.036 gram/cubic centimeter
Compression load: 2.00 kilogram/square centimeter
Dimensional stability: Good
Friability: Good
Resistance to chemicals: Good The term "Nacconate" is a registered trade name and "Nacconate-4040" used in these examples is a phosgenation production of tolylene diamine and has the following properties:

Brown liquid free of sediment,
Amine equivalent 106,
Viscosity (Brookfield) 90 at 25° C.,
Specific gravity (25° C./25° C.) 1.26,
Solidification point lower than −15° C., and
Approximate flash point (Cleveland open cup) 132° C.

What I claim is:

1. A polyether polyol, useful in the production of polyurethane foam, produced by subjecting alkylene oxide to addition polymerization, employing, as an initiator, the reaction product of the reaction of 3- to 6-functional polyol with a reducing mono-saccharide under acidic conditions, said mono-saccharide being selected from the group consisting of glucose, invert sugar, wood sugar and galactose.

2. A polyether polyol having a hydroxyl number of 250–550 (mg. KOH/g.), useful in the production of rigid polyurethane foam, produced by subjecting alkylene oxide to addition polymerization, employing, as an initiator, the reaction product of the reaction of 3- to 6-functional polyol with a reducing monosaccharide under acidic conditions, said monosaccharide being selected from the group consisting of glucose, invert sugar, wood sugar and galactose, the ratio of alkylene oxide to initiator being adjusted to correspond to a hydroxyl number of 250–550 in the resultant polyether polyol.

3. A polyether polyol having a hydroxyl number of 250–550 (mg. KOH/g.), useful in the production of rigid polyurethane foam, produced by subjecting alkylene oxide to addition polymerization, employing, as an initiator, the reaction product of the reaction of 3- to 6-functional polyol with gucose under acidic conditions, the ratio of alkylene oxide to initiator being adjusted to correspond to a hydroxyl number of 250–550 in the resultant polyether polyol.

References Cited by the Examiner
UNITED STATES PATENTS

| | | | |
|---|---|---|---|
| 3,018,281 | 1/1962 | Crecelius | 260—209 |
| 3,042,666 | 7/1962 | Gentles | 260—209 |
| 3,169,934 | 2/1965 | Dennett et al. | 260—209 |
| 3,190,927 | 6/1965 | Patton et al. | 260—209 |

LEWIS GOTTS, *Primary Examiner.*

JOHNNIE R. BROWN, *Assistant Examiner.*